US007945566B2

(12) United States Patent
James et al.

(10) Patent No.: US 7,945,566 B2
(45) Date of Patent: May 17, 2011

(54) SYSTEM AND METHOD OF INFORMATION FILTERING

(75) Inventors: Frances H James, Sunnyvale, CA (US); Omar Alonso, Redwood Shores, CA (US)

(73) Assignee: SAP AG, Walldorf (DE)

( * ) Notice: Subject to any disclaimer, the term of this patent is extended or adjusted under 35 U.S.C. 154(b) by 497 days.

(21) Appl. No.: 11/891,363

(22) Filed: Aug. 10, 2007

(65) Prior Publication Data

US 2009/0043738 A1 Feb. 12, 2009

(51) Int. Cl.
*G06F 7/00* (2006.01)
*G06F 17/30* (2006.01)

(52) U.S. Cl. .................. 707/723; 707/736; 707/766

(58) Field of Classification Search .......... 707/3, 4, 707/5, 7, 722, 723, 736, 742, 766, 999.005; 709/206
See application file for complete search history.

(56) References Cited

U.S. PATENT DOCUMENTS

| | | | | |
|---|---|---|---|---|
| 6,052,714 | A * | 4/2000 | Miike et al. | 709/217 |
| 7,343,374 | B2 * | 3/2008 | Berkhin | 707/999.005 |
| 7,797,299 | B2 * | 9/2010 | Thrasher | 707/706 |
| 2003/0135497 | A1 * | 7/2003 | Mochizuki | 707/3 |
| 2003/0226108 | A1 * | 12/2003 | Oezgen | 715/513 |
| 2006/0059440 | A1 * | 3/2006 | Pry | 715/838 |
| 2007/0005590 | A1 * | 1/2007 | Thrasher | 707/5 |
| 2007/0124507 | A1 | 5/2007 | Gurram et al. | |
| 2007/0185861 | A1 * | 8/2007 | Budzik et al. | 707/5 |
| 2007/0288439 | A1 * | 12/2007 | Rappaport et al. | 707/3 |
| 2008/0005047 | A1 * | 1/2008 | Flake et al. | 706/12 |
| 2008/0005079 | A1 * | 1/2008 | Flake et al. | 707/3 |
| 2008/0133812 | A1 | 6/2008 | Kaiser et al. | |
| 2008/0183678 | A1 * | 7/2008 | Weston et al. | 707/3 |
| 2008/0263086 | A1 | 10/2008 | Chen et al. | |
| 2008/0313147 | A1 * | 12/2008 | Svore et al. | 707/3 |

OTHER PUBLICATIONS

Oliver Lemon et al, "Generation of Collaborative Spoken Dialogue Contributions in Dynamic Task Environments", American Association for Artificial Intelligence, 2002.
Davy Preuveneers et al, "Adaptive Context Management Using a Component-Based Approach", International Federation for Information Processing 2005, 2005, pp. 14-26.
Fabio Crestani et al, "Mobile and Ubiquitous Information Access", Mobile HCI 2003 International Workshop, Sep. 8, 2003.
Ralf Kernchen et al, "Context-aware Multimodal Output Selection for the Device and Modality Function", MobiLife, May 30, 2006.
George G. Robertson et al, "The Document Lens", Symposium on User Interface Software and Technology, Nov. 3-5, 1993.
Stefano Mizzaro, "Relevance: the whole (hi)story", University of Udine, Jan. 15, 1996.
Jim Youll et al, "Impulse: Location-based Agent Assistance", MIT Media Lab. Software Demos, Proceedings of the Fourth International Conference on Autonomous Agents—Jun. 2000.

(Continued)

*Primary Examiner* — John Breene
*Assistant Examiner* — Phong Nguyen
(74) *Attorney, Agent, or Firm* — Fountainhead Law Group PC

(57) ABSTRACT

In one embodiment the present invention includes a computer-implemented method of information filtering. The method includes storing a user goal. The method further includes generating search results corresponding to the user goal. The method further includes continuously filtering the search results, based on a user context that changes, to obtain a filter result related to the user goal. The method further includes outputting the filter result in accordance with a current user device.

21 Claims, 4 Drawing Sheets

OTHER PUBLICATIONS

Christian Elting et al, "Device-Dependent Modality Selection for User-Interfaces—An Empirical Study", European Media Laboratory. Proceedings of the 7th international conference on Intelligent user interfaces table of contents San Francisco, California, USA—2002.

Markus Lauff et al, "A Universal Messaging Agent Integrating Device Modalities for Individualised Mobile Communication", University of Karlsruhe. 13th International Symposium on Computer and Information Science ISCIS'98. Oct. 1998.

* cited by examiner

SYSTEM AND METHOD OF INFORMATION FILTERING

CROSS REFERENCE TO RELATED APPLICATIONS

Not Applicable.

BACKGROUND

The present invention relates to information filtering, and in particular, to information filtering using context that is updated as the context changes.

Unless otherwise indicated herein, the approaches described in this section are not prior art to the claims in this application and are not admitted to be prior art by inclusion in this section.

Users are becoming increasingly mobile and are demanding that services and applications be reachable from mobile devices. Searching is a primary task for both internet users and knowledge workers in organizations.

A typical search application takes a user query and returns relevant content, displayed in a user interface, that consists of a list of items. In the environment of a search engine, relevance is a single score metric that defines how well the item satisfies the user's intent through keyword searching, but with little understanding of the user and his or her preferences and other intent. Understanding the user's intent or information need is a key part of providing good relevance.

Thus, there is a need for improved searching tools for mobile users. The present invention solves these and other problems by providing systems and methods for information filtering.

SUMMARY

Embodiments of the present invention improve information filtering. In one embodiment the present invention includes a computer-implemented method of information filtering. The method includes storing a user goal. The method further includes generating search results corresponding to the user goal. The method further includes continuously filtering the search results, based on a user context that changes, to obtain a filtered result related to the user goal. The method further includes outputting the filtered result in accordance with a current user device.

The method may be applied to a task list as the user goal. The various tasks may have a status that is updated as the tasks are acted upon.

The user context may be a user location or a user device. Context may also include pre-specified preferences, stored information about previous choices in similar tasks, and day or time.

A computer readable medium may embody a computer program that implements the above method.

A computer system may execute a computer program that implements the above method.

The following detailed description and accompanying drawings provide a better understanding of the nature and advantages of the present invention.

DETAILED DESCRIPTION

Described herein are techniques for information filtering. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various methods and procedures are described below. Although the method steps may be presented in a particular order, such order is not required. Such order is provided for clarity in presentation. The order may be varied, steps may be performed before or after other steps, and steps may be performed in parallel, as desired. A second step is required to follow a first step only when completion of the first step is absolutely required prior to beginning the second step; such requirement will be apparent from the description or explicitly pointed out (if not apparent).

In general, certain embodiments of the present invention combine the following three perspectives with a ranking technique that enables the filtering and delivery of the right information to the mobile user. The first perspective is user intent or information need, as a combination of profile, personalization, query log history, etc. The second perspective is context, as a combination of geographical and time location information. The third perspective is the device, that is, the type of device that the user is currently logged into (there can be more than one).

In general, the solution provided by certain embodiments of the present invention is as follows. The "user" has a continuous information need with certain parameters that define the situational need; these are used to filter the search results providing the best relevance. As the user moves into different locations during the day, the relevant information is adjusted accordingly. The type of device has implications on the presentation of relevant content because it can lower the number of answers to be displayed. Alternative modalities can be used to counteract this limitation. These aspects are more fully detailed below.

Figure 1:
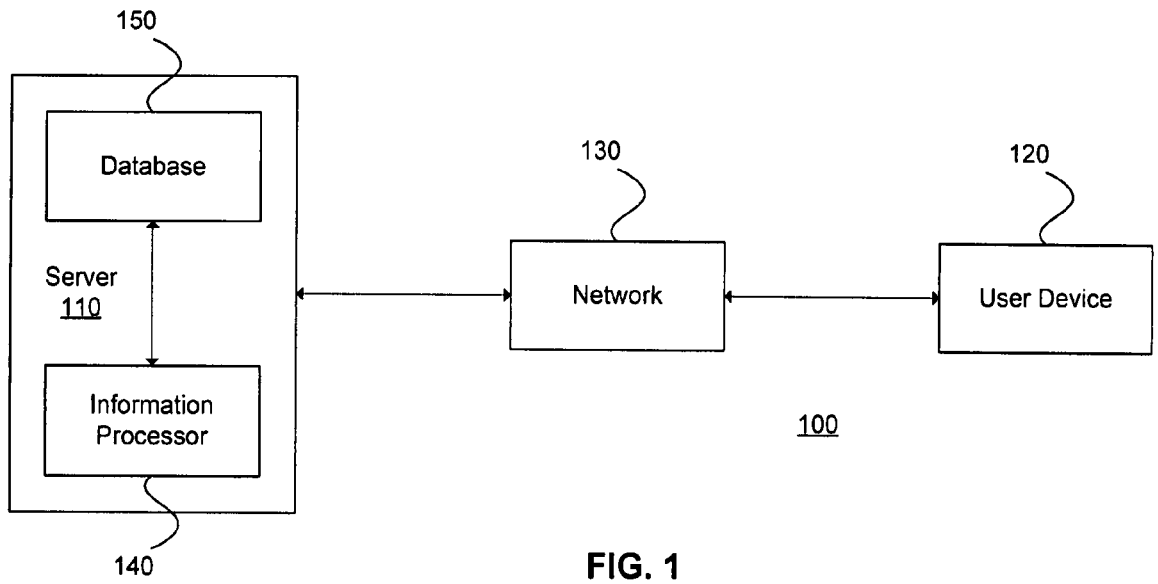
FIG. 1 is a block diagram of a system that implements an embodiment of the present invention.

FIG. 1 is a block diagram of a system 100 that implements an embodiment of the present invention. The system 100 includes a server 110 and a user device 120. A network 130 connects the server 110 and the user device 120.

The server 110 includes an information processing component 140 and a database component 150. The server 110 includes other components (not shown) such as a processor, a memory, a computer readable medium such as a hard drive, various interfaces to the network 130 or other distributed storage or processing components, etc.

The information processing component 140 performs various computer functions, such as data input, data output, data processing, searching, filtering, system control, etc. The information processing component 140 may be implemented as software that runs on the hardware of the server 110.

The database component 150 stores various data used by the server 110. The database component 150 may be partially or wholly located on other components (not shown) that connect to the server 110 (directly or via the network 130).

The user device 120 interfaces between the user and the server 110. The user device 120 may be a wired device (such as a desktop computer) or a wireless device (such as a portable computer, a personal digital assistant, or a mobile telephone). The user device 120 may include a position locator such as a global positioning system (GPS) device component.

A user may have more than one user device 120 associated therewith, such as both a desktop computer and a mobile telephone. If the user is associated with more than one user device 120, the server 110 may communicate selectively with one or more of the user devices 120.

The network 130 may include wired connections, wireless connections, or both, as appropriate for communicating with the user device 120 and the server 110. The network 130 may include the internet or the telephone system.

In general, the user interacts with the user device 120 to send queries to the server 110. The information processor 140 performs searching and filtering on the database 150 using the queries, as well as using other contextual information provided by the user device 120 or known about the user. The server 110 sends the results to the user device 120 for display to the user. These features are more fully discussed below.

Figure 2:
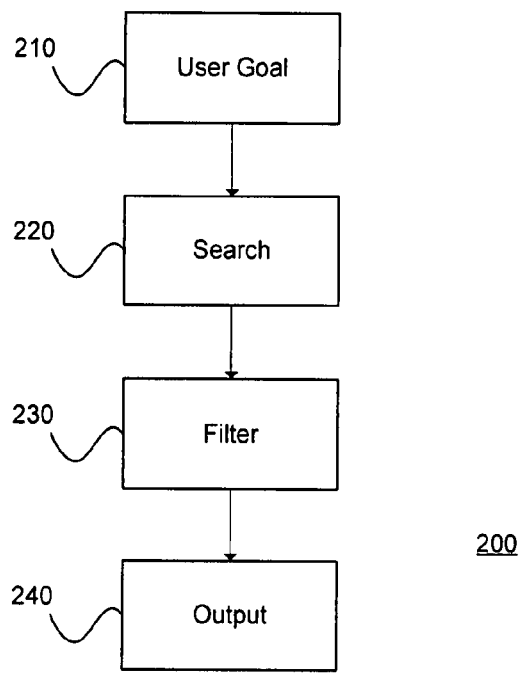
FIG. 2 is a flowchart of a method according to an embodiment of the present invention.

FIG. 2 is a flowchart of a method 200 according to an embodiment of the present invention. In step 210, a user goal is input. The user goal may be a query, a task list, a goal list, or other types of information accesses. The user goal may include a number of components, such as a task list with a ranking and a status for each task, and subtasks.

As an example, the user may input the user goal into the user device 120. The user device 120 communicates the user goal to the server 110. The server 110 may store the user goal, or it may store the user goal in the database 150.

In step 220, a search is performed based on the user goal. The search may be performed using a term frequency metric or an inverse term frequency metric. The search obtains a number of search results related to the user goal. The search results may include a number of different types of information related to the user goal, such as location, price, reviews, or coupons. Other results may include web sites, news articles, and blog entries that may be helpful to the user in achieving the goal.

As an example, the information processor 140 may search the database 150 using the user goal as the query. The database 150 may include a variety of types of data and may return a subset of the data as search results according to the parameters of the query.

In step 230, filtering is performed on the search results using user context. The user context changes periodically, and as a result, the filtering results in different filter outputs as the user context changes. According to one embodiment, the user context includes the situational relevance of the user, that is, data related to the current situation the user is in. For example, if the user is mobile, the situational relevance may include information about the user's location (e.g., nearby stores may be preferred in a shopping task), the user's preferences (e.g., preferred vendors may have a higher relevance), and time of day (e.g., a store that is closing soon may be dis-preferred if it will be closing too soon for the user to reach it). According to one embodiment, the user context may include user data, for example, user profile information, user personalization information, user query log history information, etc. User data may also take the form of data gathered from previous tasks; in a shopping context, the coupons used, the reviews read, and the stores visited. According to one embodiment, the user context may include location data, for example, the geographical position of the user. According to one embodiment, the user context may include device data, that is, the type of user device(s) the user is using.

Filtering is described in more detail below.

In step 240, results of the filtering are output to the user. The results may be output in a format according to the type of user device.

As an example, the user device 120 may be a device with a small screen such as a personal digital assistance, in which case the most relevant result is displayed. As another example, the user device 120 may have a speaker, in which case the most relevant result is output as auditory information. The choice of output style for the results may be referred to as the modality (e.g., audio or visual), which is described in more detail below.

Figure 3:
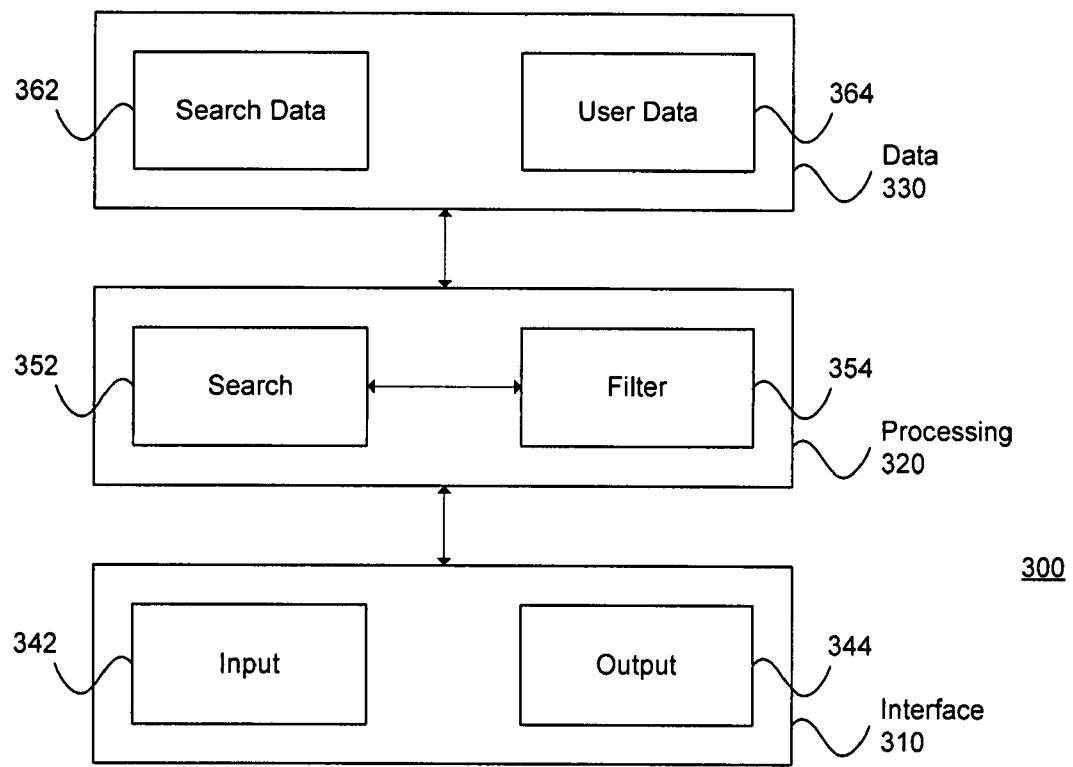
FIG. 3 is a block diagram of a computer program according to an embodiment of the present invention.

FIG. 3 is a block diagram of a computer program 300 according to an embodiment of the present invention. The computer program 300 includes an interface component 310 and a processing component 320. The computer program 300 interfaces with a data component 330. The computer program 300 may be implemented on the server 110 (see FIG. 1), in which case the information processing component 140 implements the interface component 310 and the processing component 320, and the database component 140 implements the data component 330.

The interface component 310 includes an input component 342 and an output component 344. The processing component 320 includes a search component 352 and a filter component. The data component 330 includes a search data component 362 and a user data component 364.

The input component 342 interfaces between the computer program 300 and the user. The input component 342 receives information from the user (for example, via the user device 120) such as information goals, queries, user context, user location data, user configuration data, etc. The input component 342 interfaces with the search component 352 for searching, and with the user data component 364 for storing information associated with the user.

The output component 344 formats the filter result as appropriate for the user device 120.

The search component 352 performs searching. The search component 352 receives queries from the input component 342 and accesses the search data component 362 to perform the search. The search component 352 interfaces with the user data component 364 for information about the user that may be relevant to the search, such as configuration information, query history, etc. The search component 352 provides the search results to the filter component 354.

The filter component 352 filters the search results according to the changing user context. The filter component 352 interfaces with the user data component 364 to receive the user context and other user related information that may be relevant to filtering, such as preferences data, social data, etc. The filter component 352 provides the filter results to the output component 344.

The search data component 362 stores the data that the search component 352 searches. The search data component 362 may store a large amount of information, such as an index of the internet, or may store a small amount of information, depending upon the desired comprehensiveness of the search results to be provided.

The user data component 364 stores information associated with the user, such as context information, configuration information, query history, preferences data, situational relevance, etc.

More details regarding the function of these components are provided below.

Figure 4:
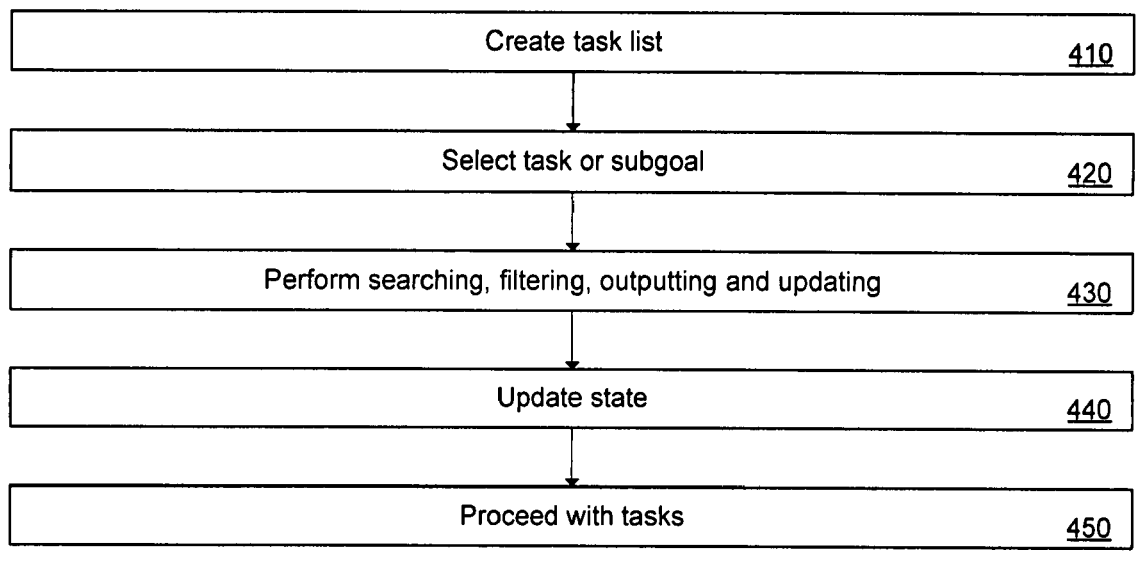
FIG. 4 is a flowchart of a task process according to an embodiment of the present invention.

FIG. 4 is a flowchart of a task process 400 according to an embodiment of the present invention. The task process 400 includes a number of details as an example. In the task process 400, the user has a high-level goal of completing a list of errands. This list serves as the "current query" to the system. While the user is mobile (for example, in the car or walking around with a smart phone), the system is constantly locating information relevant to the current query, the user's location, and her current stated subgoal (or task). New information arrives to the system, for example, when the user enters the parking lot of a store (for example, in the form of coupons) or when the user drives into a neighborhood (in the form of stores, specials, and other information). The volume of information is too much to simply present to the user in order; some care must be taken to get the most relevant information to the user at the right time, in the right place, and in the appropriate manner (or modality).

In step 410, the user is at home using a desktop computer, creating a list of errands. This list of errands constitutes the user's goal. This initial input may be referred to as a query or goal item.

In step 420, the user gets in the car and selects a subgoal: the errand to buy cat food.

In step 430, the system performs searching, filtering, outputting and updating. The system detects that the user is in the car and presents a number of choices for cat food suppliers on a map. The top search result is indicated to be PetStore, since this is a store the user has preferred to use in the past, and because it is nearby. The user selects PetStore from the map.

The system continues performing searching, filtering, outputting and updating. After the user selects PetStore, the system displays directions on car navigation system, using the audio channel to present turn-by-turn directions, and the user drives to PetStore.

The system continues performing searching, filtering, outputting and updating. Once the user has reached PetStore, she gets out of the car. The system again detects a device change from the display and audio interface in her car to her cell phone. The phone displays relevant information for purchasing cat food. There are multiple options for the display at this time. First, if the user is a frequent customer, the system may present a coupon for the cat food that the user usually buys. Second, if user is an infrequent customer, the system may present recommendations for brands, etc., based on input from the user's social network.

In step 440, the state of the task list is updated. When the user leaves the store, she takes an action to indicate the new state of the cat food task. The system changes state depending on this action. Numerous state options are available, including that the user buys the product and checks task off of the list on the PDA; the user does not buy the product, and the task remains on the list to be completed; the user does not buy the product, but decides to defer the task; and the user does not buy the product, but decides to delete the task.

In step 450, the task process proceeds. The user returns to the car, and the interaction is moved back to the vehicle interface. The system helps the user to continue to meet the main goal of completing errands. If the subtask of buying cat food was marked as completed, deferred, or deleted, the system pops back to the goal state. If the task is still on the list, the system may ask whether the user wants to continue the current task, or it may suggest another task on the list that can be completed in the local area.

Note that in the process 400, the sequence of actions and interfaces changes along a timeline. As the user changes interaction devices (vehicle system, phone, desktop computer) during the course of the interaction, the system automatically adapts to these changes.

As another example, consider that the user wants to process a task list as the user goal. The task list includes a number of tasks as the goal items, and each task includes a state (such as pending, deferred, completed, etc.). The user may initially rank the tasks, and the system may generate search results for the top ranked task. The user then proceeds with the task as the system continuously filters the search results according to the changing user context. The user then updates the state of the task (for example, as the task is completed). The system may then move to the next ranked task, in effect re-ranking that task as the new top ranked task. The system may then proceed with the new task (search, filter, output, etc.).

The concept of relevance is a fundamental part of a search activity, since the main goal of a search is to provide relevant and little (or no) non-relevant content. Relevance is an abstract concept, the meaning of which depends on the user's perception of information and the user's information need situations.

An embodiment of the present invention focuses more on "situational relevance" and includes a filter mechanism to refine the most appropriate relevant answer. Briefly, consider a framework consisting of four dimensions to relevance. First are information sources, which are document collections or representations of a document (surrogate). Second are representations of the user's need, where the user perceives an information need and expresses it in a request. Third is time, where the document or surrogate is a valid at a certain point and may not be valid afterwards. Fourth are components, in which a document or surrogate is relevant the user request with respect to a set of components (topic, task, and context).

Situational relevance may be defined as the relation between a document or surrogate and the user's view of the world or the situation.

In this context, a filter selects the best possible relevant content using a combination of time, location, and device as the main parameters with the help of related information such as focus, preferences, and social aspect. In summary, embodiments of the present invention use filtering to provide the best relevance for the best situation (from the user's perspective).

Since relevance implies a goal that has to be satisfied, the user interacts with the system using the relevant content to complete the objectives. One aspect of the technique is the computation of the relevance, which is done automatically using a filter that associates time, location, and device. The process works as follows. There is a basic match between the information source and the user's intent that is computed using standard information retrieval techniques based on term frequency and inverse frequency metrics. Now, several documents or surrogates can satisfy the match function. The relevance filter then calculates a separate metric weighting time, location, and device for each item and then selects the highest value, which is then presented to the user. If the content is relevant to the user and helps achieve the goal, the user may select a next goal or consider the task completed. If not, the user may explore further relevant answers.

Referring to the process described in FIG. 4, we can see that in each step, relevance is calculated based on the current location, device, and task status (i.e., which subgoal the user is working on). The selection process uses this information to determine which documents or sources to present, and in which modality. When the user pulls into the parking lot of PetStore, for example, her car senses this from GPS readings. Stepping out of the car, the PDA presents information relevant to buying cat food, namely, the coupons. The system knows that the PDA screen is small, so only the most relevant coupon is displayed. The user has the ability to explore other information sources, such as other coupons, ratings of the pet foods from her social network, internet sources related to pet food recalls, etc. For each source, the presentation is adapted to work well on her PDA.

Situational Need

Following the definition of situational relevance, situational need is therefore a representation of documents or surrogates that best represents the current need. This can be done as a mechanism to store the useful information need is some shape or form like a textual list, a personalized interface, query logs, etc.

Temporal Identification

The time domain T is a set of equidistant points ordered by a relation of precedence that allows the system to answer basic ordering requests like before, after, and equal. A timeline is a sequence of such points. Temporal identification of an event may be done by taking a system timestamp of a transaction or user interaction.

Geographical Location

The geographical location is derived from the device's internal mechanisms as a set of points that define a location. This may be done using global positioning system technology (GPS).

Focus+Context

The focus+context technique states the user needs detailed information (focus), but also needs to retain a global context. The information in the overview may be different from the one presented in the detail; for example, computer games often show the user's current situation (the focus), as well as a map of where the user is in the virtual world (the context). The presentation of both focus and context within a single display is a feature that allows item-level exploration while maintaining the user's sense of the whole space.

Focus+context can apply both to the user's activity and to how information is presented to the user. From an activity perspective, the system supports the user in maintaining the context or larger goal, for example, completing a list of errands. The focus portion of the activity is on the current task. Relevancy may be judged both from the focus and the context: search results may be relevant because they refer to the current sub-task and are appropriate for the user's current location or state, but search results may also be relevant not because they are appropriate to the current sub-task, but because they draw the user's attention to the fact that the larger goal may not be met unless the user shifts to a different subtask at the current time.

From the presentation perspective, the output of the system to the user may present the most relevant results to the user in a way that helps the user to focus, while presenting other results as a context. For example, the most relevant result may be rendered in audio, to draw the user's attention to it, with context information presented secondarily on a small visual display.

User Interfaces/Channels/Modalities

One of the goals of embodiments of the present invention is to provide relevant search results to users while they are in different contexts, and especially when they are mobile. As shown with reference to FIG. 4, users will frequently change devices while completing a task, moving from a desktop computer to a vehicle-based computer to a smart mobile device. Relevancy-based filtering helps to limit the amount of information presented to users at any given time. For example, the user's location, time of day, and other contextual attributes may be used to determine that certain search results are more appropriate than others at any given time. Based on this, the system may choose to present only the most relevant information to a user in a given situation, or may also choose not to present any new information at all to the user.

Limiting the amount of information presented to the user fits well to mobile interaction strategies, where the available devices and modalities place restrictions on input and output as compared to desktop computing. Mobile users do not generally have access to the large displays, keyboards, and mice found in desktop environments. Mobile devices frequently support multimodality (such as speech input and audio output) to compensate for small screens, smaller keyboards, and divided user attention. However, multimodality raises new issues when used for the presentation of search results.

On the output side, it is desirable to present information to mobile users in audio, since their visual attention is often occupied with mobility-related tasks such as walking or driving. Audio information can be received by users without requiring them to orient themselves towards the sound source (although directional sound has its uses as well), and is useful for signaling users to new information in the environment. However, audio information takes time to be presented, and this time is generally longer than the time needed to read the equivalent text. Since one key to presenting information (and especially search results) to mobile users is to get the information to them in a timely manner, audio presentation should be limited to the most relevant information, and the information should be kept brief.

Visual output may also be used in mobile contexts, but may be limited to smaller screens and may be restricted to supporting material that does not require as much visual attention. For example, a small visual display in a vehicle may be used to show a map to reach the location specified by a search result that has been presented to a user in audio. On a mobile (non-vehicle) device such as a smart phone, the visual display may be used to show a coupon or advertisement related to the first search result (see above related to FIG. 4), or may show further search results.

Input modalities may similarly support the divided attention of the mobile user. For the most part, the relevancy-based filtering techniques minimize the need for explicit user intervention while mobile, because a single most-relevant result may be presented to the user. Other user input in the form of result selection or dismissal of results may use the voice modality or physical buttons on the mobile device.

Decision Process for Selecting Modalities, Etc.

Embodiments of the present invention are directed toward selecting modalities and means of presentation to support mobile users and their information needs. Based on the devices generally available to mobile users, information to be presented to the user may be separated into two modalities: audio (both speech and non-speech) and visual. The audio channel may be used for primary material, as it is the best modality for signaling users in a divided attention situation and for presenting information without distracting from primary mobility tasks (such as driving or walking). Visual displays may be used to augment the audio channel by presenting secondary supporting material.

The classification between primary and secondary material depends upon the information to be presented. For example, if the user has programmed a reminder for a task, an audio beep signaling the reminder to the user may be the primary material, and the details of the task item may be presented as textual secondary material. As another example, if the user is performing a shopping task and a coupon becomes filtered as the most relevant result, an audio speech synthesis may state, "Coupon found, fifty cents" as the primary material, and the details of the coupon such as expiration date, etc. may be presented as textual secondary material. The classification between primary and secondary material may be configured on the server and may vary depending upon the current user device.

In a search task, the selection of the primary and secondary material to present is facilitated by the relevancy filtering discussed above. When results are highly time- or location-critical, the presentation should follow what we call the "feeling lucky" approach. Similar to certain internet search tools, where the user is brought to the first result of a search query automatically without having to see the list of results, the first or most relevant result is automatically presented to the user in audio. Supporting material, such as maps or coupons, may be presented using the small display (the car screen or the screen on the smart phone). Directional audio may also be used to quickly orient the user to the search result, as when the information about a store ahead on the user's left is presented from the car's left-side audio speaker.

For interactions with less criticality, as when the store of interest is approaching but will not be reached by the user for another few minutes, audio may still be the primary channel to avoid distracting the user from the mobility task. However, the audio presentation does not need to be limited to the single most relevant result, since there is still time to get user feedback on other search results. In this case, other options may be made available to the user either as an audio list, or using the secondary visual display. In the case of the visual display, multiple options may be (for example) presented on a map that also shows the user's current location. The user may choose any of the available options by voice or using manual entry. When the user approaches the chosen target, the output mode can switch back to "feeling lucky" mode to help the user focus on the target.

Figure 5:
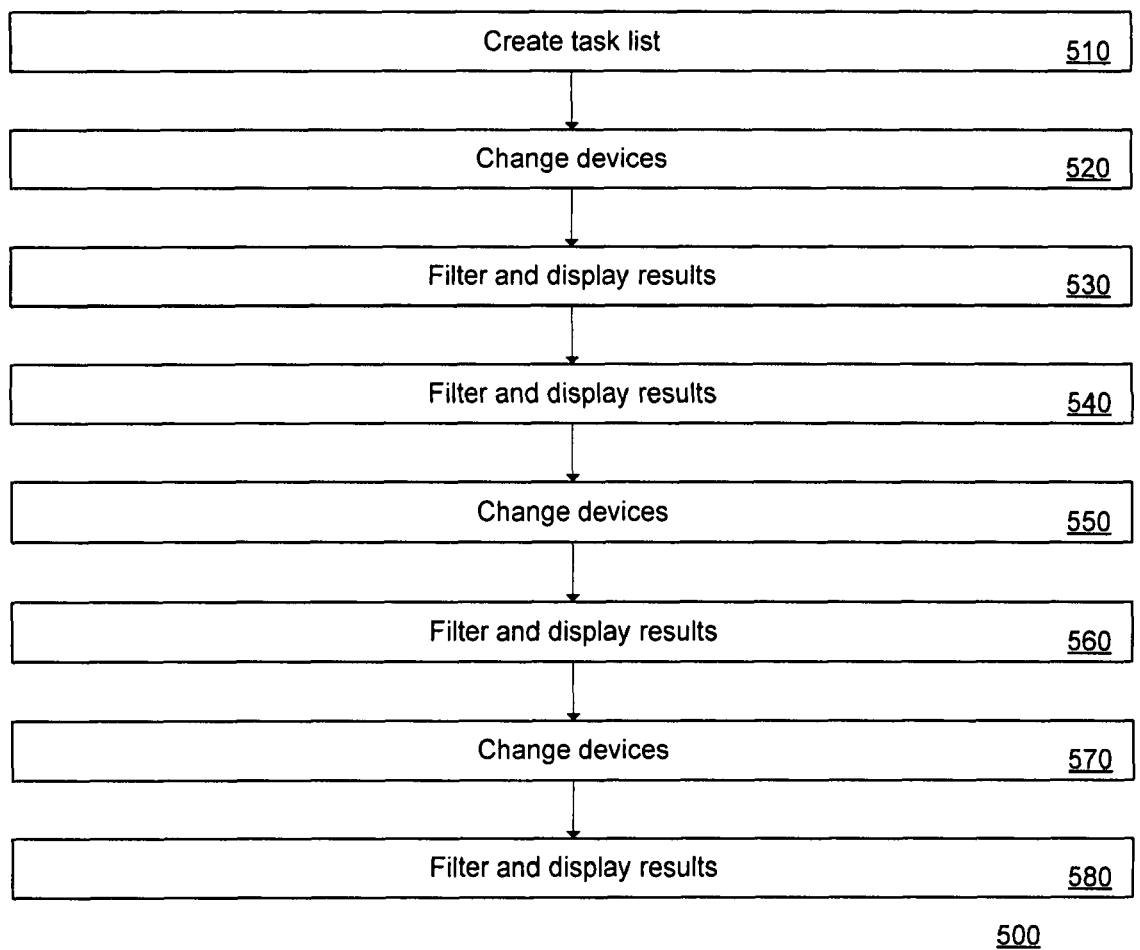
FIG. 5 is a flowchart of an example task process 500 according to an embodiment of the present invention.

FIG. 5 is a flowchart of an example task process 500 according to an embodiment of the present invention. An embodiment of the present invention may be used to assist the user in completing a task list as further detailed below.

In step 510, the user is at home, creating a list of errands. Errands include: to buy cat food; to buy new sneakers; and to drop off dry-cleaning. The main goal is to complete errands. Subgoals are each of the errands to be completed. The list may be initially created on the user's home computer. The user's home computer may provide the list to the server 110 (see FIG. 1).

In step 520, the user leaves home and gets in the car. The car recognizes the presence of the driver, for example by detecting the presence of the car key in the ignition, or by receiving a "door unlock" signal from a remote entry component. The car and the system exchange information regarding the device change from the home computer to the car. The car brings up the errand list on the car computer, for example in a textual display modality. According to one embodiment, the car computer and the system interact through a Vehicle Object Warehouse (VOW) that is accessible to the user/driver at all times. (VOWs are discussed in more detail in U.S. patent application Ser. No. 11/788,406 titled "Systems and Methods for Information Exchange Using Object Warehousing".) The user selects the errand "buy cat food", since the user knows the pet store is close to home and it's first on the list.

In step 530, the car computer presents a number of cat food suppliers in area. The system ranks PetStore as number one on the list of suppliers, because it scores high on several situational relevancy measures: first, it is the user's preferred store, and second, it is close by.

In step 540, the car navigation system provides directions, and the user drives to PetStore. The directions may be presented as audio turn by turn directions as the primary modality, and as a map display as the secondary modality.

In step 550, the user reaches the PetStore parking lot and exits the vehicle. On turning off the car, the system detects a device change and begins sending information to the user's mobile device, since the car is off and the user is known to be outside the home. The device change may also be signaled by the user pressing a button or otherwise engaging the mobile device. The system may also detect a device change by detecting a position difference between the mobile device and the car, for example when both devices have GPS components, indicating that the user has left the car. The user's mobile device and the system may also interact via the VOW.

Relevant information for the cat food purchasing task is available on the mobile device, including: a coupon for the user's preferred brand, links to web sites about cat food recalls, the user's frequent buyer account information, and recommendations for additional purchases, such as other brands of food or pet toys. The user decides to check the recall sites to ensure that her preferred brand is not on the list (it's not); she then gets the cat food, and checks the recommendations and decides she'd like to buy a new toy for the cat. At the checkstand, she displays the coupon for the cashier, as well as her frequent buyer account. These are scanned or otherwise processed by the cashier, and the user leaves the store with her purchases.

In step 560, the user leaves the store and refers to the errand list on the PDA. She checks off the cat food task, since it is completed, and the system suggests a next errand. The errands are re-ordered (again, based on situational relevancy): the system knows that the preferred dry cleaner is close by and will be closing soon, so it suggests that the user complete the dry cleaning task next, rather than the "buy new sneakers" task. Note that in this way, the system focuses on the user's main goal (completing all errands), rather than blindly following the subgoals as they are listed. If the system did not do this, the user might miss the opportunity to drop off the dry-cleaning and complete the whole list, since the cleaner will be closing soon.

In step 570, the user enters the car, and the system moves the interaction back to the car computer. The user has a preferred cleaner, and the system knows this information, so the filtering results in the preferred cleaner, and the system provides this information to the car computer to provide directions.

In step 580, the user gets to the parking lot, exits the car, and drops off the dry-cleaning. The user checks off the dry cleaner task on the errand list. The system suggests that the user move on to the next errand, "buy sneakers."

Besides the actions discussed above, the user may perform a number of alternative actions on leaving a store: [1] the user buys a product and checks the task off of list on the PDA (as in step 560); [2] the user does not buy a product, and the task remains on the list to be completed; [3] the user does not buy a product but decides to defer the task; or [4] the user does not buy a product, but decides to delete the task.

For [2], [3], or [4], the system may automatically suggest a next task. The task suggestion may be based on the order on the list, whether the task can be satisfied easily in the current local area (for example, on account of the closing time of the store), or choices made on similar (previous) trips.

Figure 6:
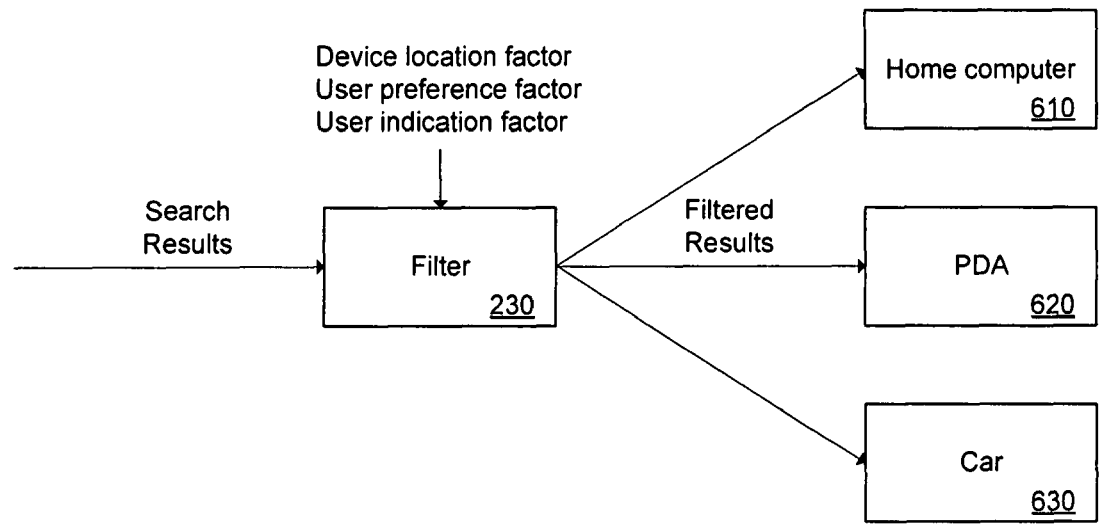
FIG. 6 is a block diagram of various user devices that may be used according to embodiments of the present invention.

FIG. 6 is a block diagram of various user devices that may be used according to embodiments of the present invention. As discussed above, the server 110 may communicate the filter results to a variety of user devices 120 (see FIG. 1 and related text). FIG. 6 shows an example where a user is associated with three user devices, including a home computer 610, a PDA 620, and a car computer 630.

As a default, the system may provide the filter results to all devices associated with a user. (The user association may be through a login or other configuration information.) The system may also provide the filter results to the various devices selectively according to various factors. These factors include a device location factor, a user preference factor, and a user indication factor.

The device location factor allows the system to send the filtered results selectively based on device location. For example, the PDA 620 and the car computer 630 may each be associated with GPS modules. When the GPS modules indicate that the user's car and the PDA 620 are located at the user's house, the system sends the filtered results to the home computer 610.

The user preference factor allows the user to define various circumstances that determine to which device the system sends the filtered results. For example, the user may configure the system to always provide the filtered results to the PDA 620 in addition to any other devices that the system is sending the filtered results.

The user indication factor results when an action of the user indicates to the system that the user is using a specific device. The user may indicate use by pressing a button or other input on the device, either as a specific "device change" button or just through the normal course of inputting information into the device. Alternatively, the user may indicate to the system to stop sending results to a particular device, for example by pushing a "stop" button. For example, the system knows the user is using the home computer 610 when the user is typing on the computer. As another example, the system knows the user is using the PDA 620 when the user is pressing the touchpad or buttons. As another example, the system knows that the user is using the car computer 630 when the car is turned on. As another example, if the system is sending the filtered results to both the PDA 620 and the home computer 630, the user can instruct the system to stop sending the filtered results to the PDA 620 by pushing a button on the PDA 620.

The system reviews all the factors at its disposal and determines the device to receive the filtered results. For example, when the GPS modules of the PDA 620 and the car computer 630 indicate that the user is in the car (device location factor), the system sends the filtered results to the car computer 630 because that is what the user had previously indicated as the user's stored preference (user preference factor), unless the user pushes the "get results" button on the PDA 620 (user indication factor).

Figure 7:
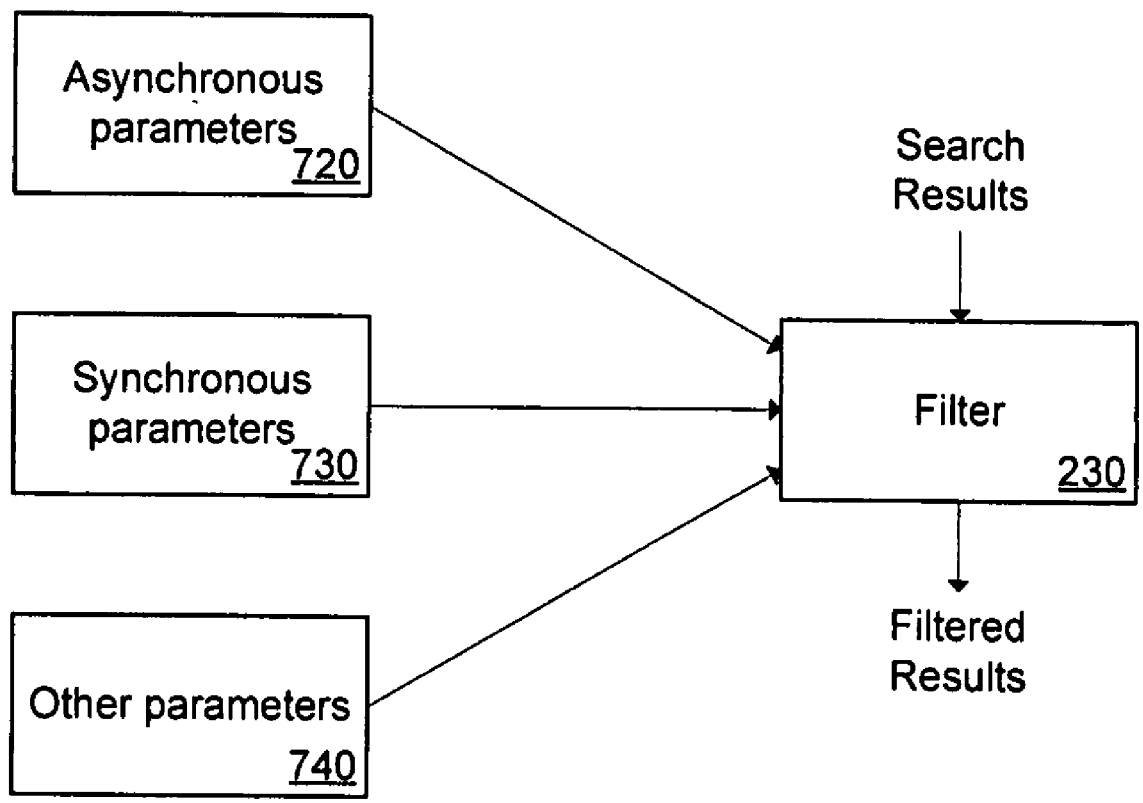
FIG. 7 is a block diagram that illustrates filtering according to an embodiment of the present invention.

FIG. 7 is a block diagram that illustrates filtering according to an embodiment of the present invention. The step of filtering 230 (see FIG. 2) performs filtering of the search results according to three types of inputs: asynchronous parameters 720, synchronous parameters 730, and other parameters 740.

The asynchronous parameters 720 are those that may change asynchronously, for example, according to user-initiated actions. The asynchronous parameters adjust the filtering to account for device changes, since the type of device being used impacts the relevancy of each search result. The asynchronous parameters include the user transitioning from one device to another, the user discontinuing use of a device, the user interacting with a new device, etc., as discussed above regarding FIG. 6.

The synchronous parameters 730 are those that change synchronously, that is, that are updated at a defined interval. The synchronous parameters adjust the filtering to account for time changes and location changes, since the current time and the user's current location impact the relevancy of each search result. The defined interval may be 60 seconds, or another time period, and may be adjusted by the user. The defined interval may also change based on other factors, for example, a longer interval when the user is stationary and using the home computer, or shorter when the user is mobile and receiving directions from the car computer.

The other parameters 740 are those that are other than the asynchronous parameters 720 and the synchronous parameters 730. The other parameters 740 include user preferences, user search history, user social data, and other user-related context information.

As an example of continuous filtering, consider the task process described above regarding FIG. 6. The task list created in step 5 1 0 results in a variety of search results. The asynchronous parameters 720 and the synchronous parameters 730 do not change since the user is continuing to use the home computer at this time. The system filters the results based on the other parameters 740. One of the other parameters 740 is the user preference that items in a task list are presented in the order entered, so that is how the system filters the results for display.

Then when the task process moves to steps 520, 530 and 540, the asynchronous parameters 720 change to account for the user interacting with the car. The search results for each task include the location of each task, so when the user is in the car, the filter is adjusted, and the location information regarding the tasks becomes more relevant. After the user has selected the "buy cat food" task in steps 520 and 530, the other parameters 740 include the user's preference information for PetStore, so the combination of the filtering parameters results in turn by turn directions (the user is in the car) to PetStore (the user's preference).

As the car's location changes in step 540, the synchronous parameters 730 change to account for the user's location. The most relevant information is not just the turn by turn directions, but becomes the specific next direction command ("turn left" or "turn right", etc.) at the appropriate time.

The server 110 may implement an algorithm to filter the search results. The filter parameters then associate various weights to the search results, and the filtering algorithm processes the weights to determine the relevancy of each search result. For example, for the "buy cat food" task, the search results may include a number of stores. The user has a preference for PetStore, so the server 110 increases the weight applied to that result, and the filter gives that result as the most relevant. Continuing the example, when the user is in the car, the weight is increased regarding the results involving the location of the task items. The general information "PetStore" receives less weight, and the specific information "directions to PetStore" receives more weight; as the weights adjust, the filtered results change such that "directions to PetStore" is the most relevant. Then as the car is moving, the general information "directions to PetStore" receives less weight, and the specific information "turn left here" receives more weight.

The weight provided by each filter parameter may also be adjusted, so that one user's filter parameter weights may differ from those of another user, and hence the relevancy of information becomes filtered according to the specific user. For example, one user instructs the system to give a relatively large weight to the user's social network ratings when filtering, whereas another user instructs the system to give a relatively small weight to the user's social network ratings when filtering.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of information filtering, comprising the steps of:
storing a user goal;
generating a plurality of search results corresponding to said user goal;
filtering said plurality of search results, based on a user context, to obtain a first plurality of filter results related to said user goal, wherein said first user context includes device information that indicates a current user device having a primary output modality and a secondary output modality;
outputting a first most relevant one of said first plurality of filter results in accordance with said primary output modality of the current user device, and outputting a first next most relevant one of said first plurality of filter results in accordance with said secondary output modality of said current user device, wherein said primary output modality and said secondary output modality include an audio modality and a visual modality;
filtering said plurality of search results, based on a new user context, to obtain a second plurality of filter results related to said user goal, wherein the new user context results from a change in the device information wherein the primary modality becomes a new secondary modality; and
outputting a second most relevant one of said second plurality of filter results in accordance with a new primary output modality of the current user device, and outputting a second next most relevant one of said first filter result in accordance with said new secondary output modality of said current user device.

2. The method of claim 1, wherein said user goal includes a task list, and wherein said task list includes a plurality of tasks and a plurality of statuses.

3. The method of claim 1, wherein said user goal includes a goal item and a state of said goal item, further comprising:
updating said state of said goal item in accordance with a user action related to said goal item.

4. The method of claim 1, wherein said user goal includes a plurality of goal items and a plurality of states, wherein each of said plurality of states corresponds to one of said plurality of goal items, further comprising:
ranking said plurality of goal items, wherein said plurality of search results are generated for a highest-ranked goal item of said plurality of goal items;
updating a state of said highest-ranked goal item in accordance with a user action related to said highest-ranked goal item; and
re-ranking said plurality of goal items.

5. The method of claim 1, wherein said step of generating comprises generating said plurality of search results based on a term frequency metric or an inverse term frequency metric.

6. The method of claim 1, wherein filtering said plurality of search results includes continuously filtering based on a situational relevance that changes.

7. The method of claim 1, wherein filtering said plurality of search results includes continuously filtering based on user data that changes, location data that changes, and device data that changes.

8. The method of claim 1, wherein filtering said plurality of search results includes continuously filtering based on focus data, preferences data, and social data.

9. The computer-implemented method of claim 1, wherein the user context corresponds to a mobile context and the new user context corresponds to a shopping context.

10. The computer-implemented method of claim 1, wherein the user context corresponds to a first geographic location and the new user context corresponds to a second geographic location.

11. The computer-implemented method of claim 1, wherein the first most relevant one of said first plurality of filter results corresponds to auditory turn-by-turn direction information, wherein the first next most relevant one of said first plurality of filter results corresponds to visual mapping information, and wherein the second most relevant one of said second plurality of filter results corresponds to visual coupon information.

12. A computer readable medium embodying a computer program for information filtering, said computer program comprising:
a search module that generates a plurality of search results corresponding to a user goal;
a filter module that filters said plurality of search results, based on a user context, to obtain a first plurality of filter results related to said user goal, wherein said first user context includes device information that indicates a current user device having a primary output modality and a secondary output modality; and
an output module that formats a first most relevant one of said first plurality of filter results in accordance with said primary output modality of the current user device, and that formats a first next most relevant one of said first plurality of filter results in accordance with said secondary output modality of said current user device, wherein said primary output modality and said secondary output modality include an audio modality and a visual modality,
wherein the filter module is further configured to filter said plurality of search results, based on a new user context, to obtain a second plurality of filter results related to said user goal, wherein the new user context results from a change in the device information wherein the primary modality becomes a new secondary modality, and
wherein the output module is further configured to format a second most relevant one of said second plurality of filter results in accordance with a new primary output modality of the current user device, and to format a second next most relevant one of said first filter result in accordance with said new secondary output modality of said current user device.

13. The computer readable medium of claim 12, further comprising:
an input module that receives said user goal and said user context.

14. The computer readable medium of claim 12, wherein said search module interfaces with a first database and a second database, wherein said search module searches said first database using said user goal to generate said plurality of search results, and wherein said second database stores said user goal.

15. The computer readable medium of claim 12, wherein said search module generates said plurality of search results based on a term frequency metric or an inverse term frequency metric.

16. The computer readable medium of claim 12, wherein said filter module continuously filters said plurality of search results based on a situational relevance that changes.

17. A computer system including a computer program for information filtering, said computer program comprising:
a search module that generates a plurality of search results corresponding to a user goal;
a filter module that filters said plurality of search results, based on a user context, to obtain a first plurality of filter results related to said user goal, wherein said first user context includes device information that indicates a current user device having a primary output modality and a secondary output modality; and
an output module that formats a first most relevant one of said first plurality of filter results in accordance with said primary output modality of the current user device, and that formats a first next most relevant one of said first plurality of filter results in accordance with said secondary output modality of said current user device, wherein said primary output modality and said secondary output modality include an audio modality and a visual modality,
wherein the filter module is further configured to filter said plurality of search results, based on a new user context, to obtain a second plurality of filter results related to said user goal, wherein the new user context results from a change in the device information wherein the primary modality becomes a new secondary modality, and
wherein the output module is further configured to format a second most relevant one of said second plurality of filter results in accordance with a new primary output modality of the current user device, and to format a second next most relevant one of said first filter result in accordance with said new secondary output modality of said current user device.

18. The computer system of claim 17, further comprising:
an input module that receives said user goal and said user context.

19. The computer system of claim 17, wherein said search module interfaces with a first database and a second database, wherein said search module searches said first database using said user goal to generate said plurality of search results, and wherein said second database stores said user goal.

20. The computer system of claim 17, wherein said search module generates said plurality of search results based on a term frequency metric or an inverse term frequency metric.

21. The computer system of claim 17, wherein said filter module continuously filters said plurality of search results based on a situational relevance that changes.

* * * * *